United States Patent [19]

Kato et al.

[11] 4,374,310

[45] Feb. 15, 1983

[54] SWITCH ARRANGEMENT ON MOTOR VEHICLE STEERING WHEELS

[75] Inventors: Shinichi Kato, Fujisawa; Hiroshi Tsuda; Kiyoshi Yamaki, both of Yokohama; Tadashi Suzuki, Yokosuka; Fumiyoshi Kuwano, Yokohama, all of Japan

[73] Assignee: Nissan Motor Company, Limited, Kanagawa, Japan

[21] Appl. No.: 246,616

[22] Filed: Mar. 23, 1981

[30] Foreign Application Priority Data

Mar. 25, 1980 [JP] Japan ................................. 55-37764

[51] Int. Cl.³ .............................................. H01H 9/00
[52] U.S. Cl. ................................. 200/61.54; 200/61.55
[58] Field of Search .......................... 200/61.54–61.57

[56] References Cited

U.S. PATENT DOCUMENTS

| | | | |
|---|---|---|---|
| 2,863,015 | 12/1958 | Aherns | 200/61.54 |
| 3,544,743 | 12/1970 | Takei et al. | 200/61.54 |
| 4,004,114 | 1/1977 | Baduel | 200/61.56 |
| 4,131,772 | 12/1978 | Weckenmann et al. | 200/61.54 |

FOREIGN PATENT DOCUMENTS 1111235  4/1968  United Kingdom ............ 200/61.55

*Primary Examiner*—J. R. Scott
*Attorney, Agent, or Firm*—Lowe, King, Price & Becker

[57] ABSTRACT

A steering wheel device for an automotive vehicle, comprises a steering shaft arranged in the automotive vehicle, a steering wheel frame fixed to the upper end portion of the steering shaft, a main frame which can move in relation to the steering wheel frame, a steering wheel pad attached to the main frame in such a way that the steering wheel pad can function as a horn switch, the steering wheel pad having a plurality of operation holes, and a plurality of operation switches for controlling an electric device other than the horn switch, the operation switches being fixed at the bottom portion thereof to the steering wheel frame. The top of the operation switches is placed in the corresponding operation holes and apart from the front surface of the steering wheel pad by such a distance that, when the steering wheel pad is pushed to actuate the horn switch, the top of the operation switches does not protrude from the front surface of the steering wheel pad.

9 Claims, 2 Drawing Figures

SWITCH ARRANGEMENT ON MOTOR VEHICLE STEERING WHEELS

BACKGROUND OF THE INVENTION

This invention relates to a steering wheel device equipped with a horn switch and other switches for operating other electric devices.

An instrument panel of an automotive vehicle is equipped with a number of switches for operating a variety of electric devices such as a radio, stereo, air-conditioning device. Generally speaking, it is difficult for the driver to operate these switches on the instrument panel while driving. For this and other reasons, it is proposed to locate these switches on the steering wheel for improved accessibility.

However, if the horn switch and other switches are provided on the steering wheel, the horn switch often cannot be easily located amongst these switches in emergency cases where horn operation is essential.

SUMMARY OF THE INVENTION

According to the present invention, a steering wheel device comprises a steering wheel including a plurality of operation switches arranged in corresponding openings provided in a steering wheel pad. The pad functions as a horn switch so as to prevent an operator from mistakenly operating the operation switches during horn switch operation. The outwardly facing surfaces of the operation switches are steering wheel pad. The top of the operation switches is recessed from the front surface of the steering wheel pad a predetermined distance within the operation holes formed in the steering wheel pad.

Therefore, the object of the present invention is to provide a steering wheel device for an automotive vehicle in which a horn switch and other switches can be prevented from being operated by mistake.

DESCRIPTION OF THE DRAWINGS

These and other objects, features and advantages of the present invention will become apparent from the following description of a preferred embodiment thereof when taken in conjunction with the accompanying drawings in which.

DETAILED DESCRIPTION OF THE PREFERRED EMBODIMENT

Figure 1:
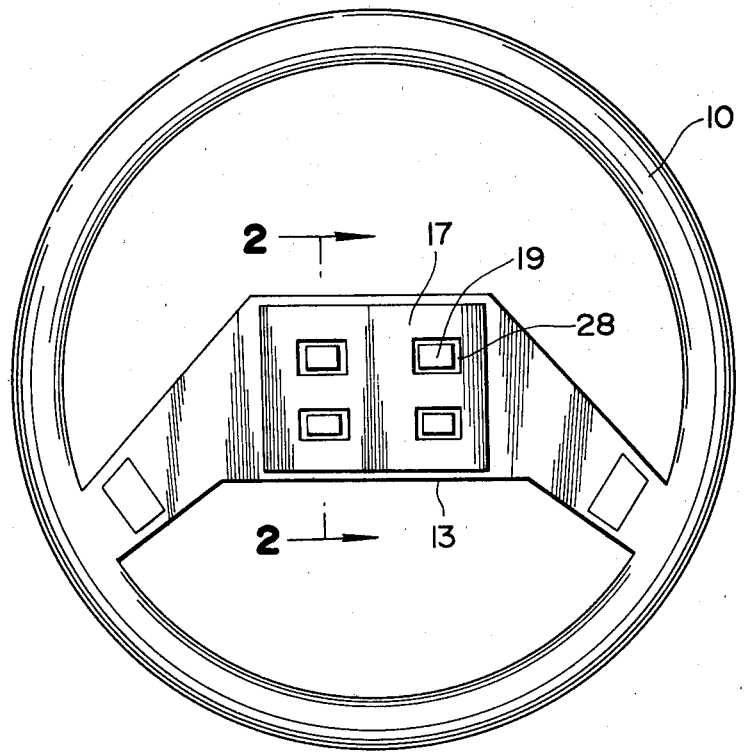
FIG. 1 is a schematic view showing a steering wheel device according to a preferred embodiment of the present invention.
Figure 2:
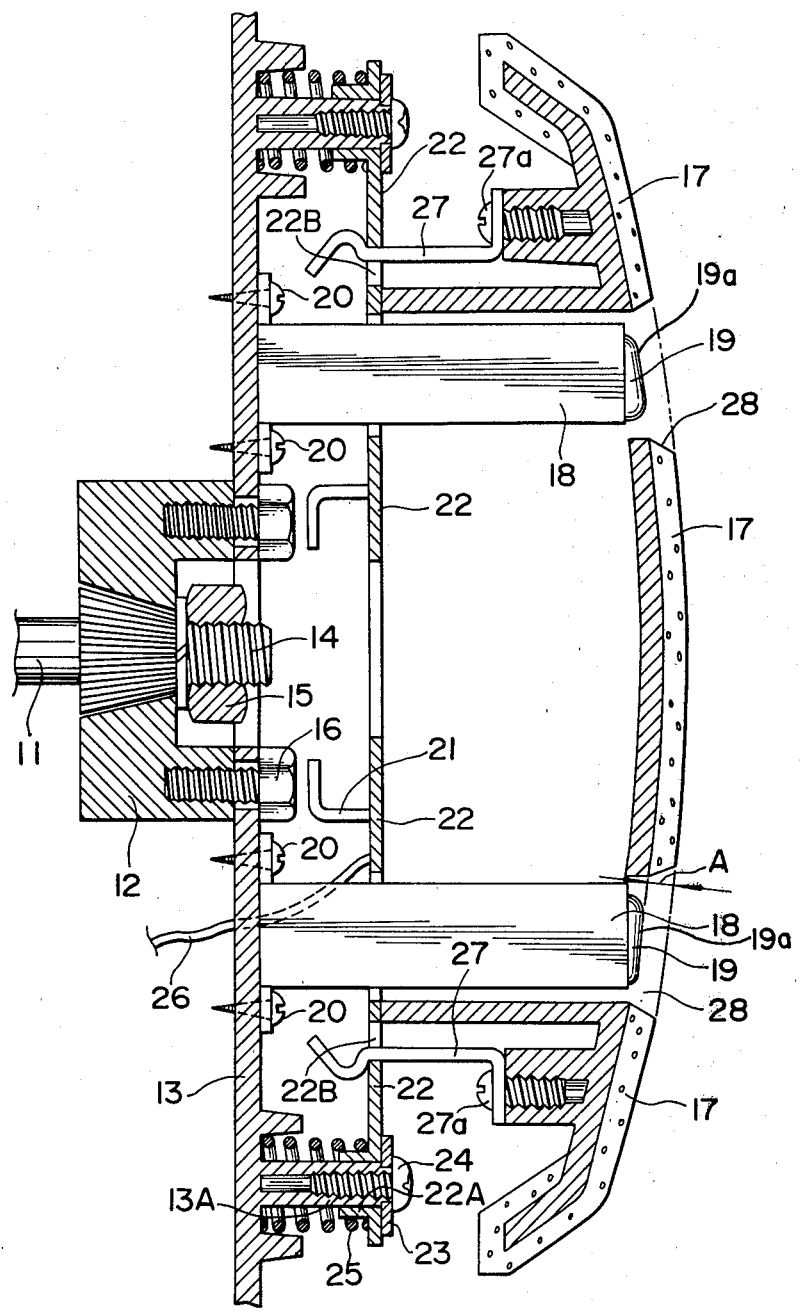
FIG. 2 is a sectional view taken along the line 2—2 in FIG. 1.

Referring now to FIGS. 1 and 2, a steering wheel 10 is connected to steering shaft 11 in an automotive vehicle at mounting portion 12.

As shown in FIG. 1, a steering wheel pad 17 is attached to a central portion of steering wheel 10 to constitute a part of a horn switch. A plurality of operation openings 28 are formed in steering wheel pad 17. A switch operation knob 19 is placed in each operation opening 28. Each switch operation knob 19 includes an outwardly facing front surface 19a that can be depressed through the respective operation opening 28 to operate a connected electric device, such as a radio, air-conditioning device and stereo, except the horn (not shown).

As best shown in FIG. 2, a steering wheel frame 13 is attached to steering wheel mounting portion 12 with bolts 16. A plurality of operation switches 18 are each secured to steering wheel frame 13 with screws 20. Switch knobs 19, mentioned above, are attached to control operation of switches 18. A nut 15 is screwed on a thread portion 14 of the steering shaft 11 so that the steering wheel mounting portion 12 may be fixed to the upper end of the steering shaft 11. The steering wheel pad 17 is used as a horn switch. A main frame 22 supports the steering wheel pad 17. The operation switches 18 pass through the respective openings of the main frame 22 and are fixed at the bottom thereof onto the steering wheel frame 13. Horn switch contact arms 21 are provided on the underside of main frame 22 and are connected to a lead wire 26 for operative connection to a horn (not shown).

The steering wheel frame 13 includes a plurality of cylindrical guide portions 13A protruding therefrom. The main frame 22 has a plurality of collar portions 22A which can be slidably arranged on corresponding guide portions 13A of steering wheel frame 13. Coil springs 25 are placed along each guide portion 13A and collar portion 22A between the steering wheel frame 13 and main frame 22. A washer 23 is fixed to the right end of the guide portion 13A by means of a screw 24. The main frame 22 is biased toward the washer 23 by the force of the spring 25. A plurality of flexible or elastic attachment arms 27 are attached to the bottom or underside of steering wheel pad 17 with screws 27a. The free end of each attachment arm elastically engages openings 22B of main frame 22 so that steering wheel pad 17 is detachably secured to the main frame 22.

Steering wheel pad 17 is rectangular in shape, as shown in FIG. 1, and slightly curved or convex, as shown in FIG. 2. Also, steering wheel pad 17 includes four rectangular holes 28, as mentioned above, through which switch knobs 19 of the operation switches 18 can be operated. It is preferable that each switch knob 19 be positioned in corresponding operation hole 28 so that the top of switch knob 19 (i.e. front surface 19a) is spaced-away from or recessed below the front surface of steering wheel pad 17 by the distance A, as shown in FIG. 2. In this manner, the top of switch knob 19 does not protrude from the front surface of steering wheel-pad 17 when the pad is pushed down against the biasing force of spring 25 in order to actuate the horn.

Preferably, each switch knob 19 is formed from conductive rubber to facilitate operation of the knob within operation hole 28.

To blow the horn, steering wheel pad 17 is pressed down at any part thereof against the biasing force of spring 25 until switch contact arms 21 contact bolts 16. As a result, the lead wire 26 is grounded to close a horn actuating electric circuit (not shown), thereby actuating the horn.

During the aforesaid horn operation, the front surfaces 19a of switch knobs 19 do not protrude from operation holes 28 into the plane defined by the outer front surface of steering wheel pad 17. In this manner, accidental operation of switches 18 is effectively prevented when steering wheel pad 17 is pushed to sound the horn.

Operation switches 18 are operated by inserting a finger into an operation hole 28 to depress the desired switch knob 19. In this manner, the horn switch or steering wheel pad 17 is easily distinguishable from knobs 19 and is not easily pushed by mistake when the operation of a switch 18 is desired.

If the operation force of the steering wheel pad 17 or the biasing force of the springs 25 is considerably larger than the operation force of the switch knobs 19, then accidental or mistaken switch operation is usually entirely avoided.

Although in the illustrated embodiment all operation holes 28 are rectangular in shape, they can be of different shape. For example, various shapes such as a circle, triangle, rectangle and other shapes can be employed in the steering wheel pad 17. In such a case, a desired switch can be easily selected by a touch method.

What is claimed is:

1. A steering wheel device for an automotive vehicle, comprising:
    a steering shaft;
    a steering wheel frame fixed to the upper end portion of the steering shaft;
    a main frame being movable in relation to the steering wheel frame;
    a steering wheel pad attached to the main frame, said pad operatively connected to a horn switch means for enabling the pad to actuate a vehicle horn when the front pad surface is depressed, said steering wheel pad having at least one operation hole; and
    at least one operation switch for controlling an electric device other than the vehicle horn, said operation switch being attached to the steering wheel frame and located within the operation hole, wherein an outwardly facing surface of the operation switch is located in the operation hole in spaced relationship from the front surface of the steering wheel pad by a depth sufficient to prevent the switch from protruding above the steering wheel pad front surface when the steering wheel pad is pushed to actuate the horn switch.

2. A steering wheel device of claim 1, further including means for biasing the steering wheel pad outwardly from a horn actuating position, said steering wheel pad biasing means having a biasing force greater than a biasing force of said operation switch, said steering wheel pad biasing force being overcome only by an operational force to be applied to the steering wheel pad to actuate the horn that is substantially greater than another operational force necessary to actuate the operation switch.

3. A steering wheel device of claim 1 further comprising a plurality of operation switches being respectively located in a plurality of operation holes provided in the pad, wherein said operation holes are of different shape.

4. A steering wheel device of claim 1, wherein said outwardly facing surface of the operation switch is formed on a switch knob operatively connected to the operation switch.

5. A steering wheel device of claim 4, wherein said switch knob is made of a conductive rubber being operable to actuate the switch when depressed.

6. A steering wheel device of claim 1, wherein said steering wheel pad includes a plurality of resilient arms projecting rearwardly from a back portion thereof, said arms having free end portions being detachably attached to the main frame to secure the steering wheel pad to the main frame in an operative position and allow for removal of the steering wheel pad when the arms are flexed so as to disengage from the main frame.

7. A steering wheel device of claim 1, further comprising spring means operatively positioned between the steering wheel frame and the main frame for biasing the main frame and the steering wheel pad in a given direction so that the horn switch can be actuated only when the steering wheel pad is pushed against the biasing force of the spring means.

8. A steering wheel device for an automotive vehicle, comprising:
    a steering shaft;
    a steering wheel frame attached to the upper end of the steering shaft;
    a main frame movable in relation to the steering wheel frame;
    a steering wheel pad operatively connected to a horn switch means for enabling the pad to actuate a vehicle horn when the front pad surface is depressed, said pad having at least one operation hole;
    spring means for releasably attaching the pad to the main frame; and
    at least one operation switch located in the operation hole for controlling an electric device other than the vehicle horn.

9. A steering wheel device according to claim 8 wherein said spring means includes a resilient arm projecting rearwardly from a back portion of the pad, said arm being releasably attachable to the main frame to secure the steering wheel pad to the main frame and to enable removal of the steering wheel pad by flexing the arm to disengage the arm and pad from the main frame.

* * * * *